INVENTOR.
WILLIAM G. REICHERT
BY
ATTORNEY.

July 30, 1957  W. G. REICHERT  2,800,689
APPARATUS FOR AUTOMATICALLY FORMING CORES ON ARBORS
Filed Aug. 13, 1954  9 Sheets-Sheet 3

INVENTOR.
WILLIAM G. REICHERT
BY
ATTORNEY.

July 30, 1957  W. G. REICHERT  2,800,689
APPARATUS FOR AUTOMATICALLY FORMING CORES ON ARBORS
Filed Aug. 13, 1954  9 Sheets-Sheet 8

INVENTOR.
WILLIAM G. REICHERT
BY
ATTORNEY.

United States Patent Office 2,800,689
Patented July 30, 1957

2,800,689

APPARATUS FOR AUTOMATICALLY FORMING CORES ON ARBORS

William G. Reichert, Newark, N. J.

Application August 13, 1954, Serial No. 449,652

24 Claims. (Cl. 22—12)

This invention relates to an automatic method and apparatus for forming cores on arbors to be employed in casting soil pipes and similar tubular cast products.

The cores formed by the apparatus of the present invention are of the arbor type and comprise a cylindrical metallic arbor having an outer coating of core sand. The function of the apparatus of the present invention is to coat the metallic arbors with the core sand to form a completed arbor core. These arbor cores are then placed in suitable molding flasks for casting soil pipes.

It is an object of the present invention to provide an apparatus of the character described and comprising means for rotatably mounting a metal arbor, conveyor means for feeding arbors to said mounting means, means for applying a coating of core sand to the arbor as the latter is being rotated, and knife means for forming said coating of core sand predetermined dimensions as the arbor is being coated.

A further object is to provide an apparatus of the character described which is automatically operated and wherein the several steps of feeding the arbor, coating the arbor with the core sand, and discharging the completed arbor from the apparatus are carried out automatically in proper timed relation by suitable electrically controlled and fluid-actuated devices.

Another object is to provide an apparatus comprising conveyor means for moving an arbor into a working position, rotatable mounting means for automatically engaging the opposite ends of the arbor in response to movement of the arbor into said working position, drive means for automatically rotating said arbor in response to engagement of the arbor by said mounting means, feed means for automatically applying a layer of sand to the exterior surface of the arbor in response to actuation of said drive means, and knife-forming means for automatically engaging said sand layer in response to actuation of said drive means and said feed means.

Still another object is to provide an apparatus of the character described comprising an apparatus as described in the next preceding object in combination with control means for automatically disengaging said knife means and de-actuating said drive means and said feed means after a predetermined time interval.

A further object is to provide means for automatically disengaging said mounting means from said arbor in response to de-actuation of said drive means and said feed means, said conveyor means including means for automatically removing said arbor from said working position and moving a second arbor into said working position in response to disengagement of said mounting means.

Another object is to provide an apparatus of the character described for forming a group of arbors simultaneously, the conveyor being indexed a distance to bring an entirely new group of arbors into working position when the first group has been completed.

A further object is to provide an apparatus of the character described wherein each of the arbor mounting means comprises a pair of spindles, means rotatably mounting the spindles, a pair of shafts slidably but non-rotatably mounted to the spindles, respectively, each of said center members being secured to a respective one of said shafts, electric motor means drivingly connected to said spindles for rotating the latter, and reciprocable fluid actuated means connected to said shafts for moving the latter with the center members secured thereto in an axial direction toward or away from each other.

Still another object is to provide an apparatus of the character described wherein said conveyor means comprises a pair of continuous flexible conveyor members extending in parallel spaced relation and including a plurality of arbor supports at spaced intervals therealong for supporting the opposite ends of a series of arbors, an actuating member mounted for reciprocal movement in the direction of said conveyor members, means for reciprocating said actuating member, and means on said actuating member for drivingly engaging said conveyor members in one direction of movement of said actuating member to move said conveyor members therewith and being drivingly disengaged from said conveyor members in the opposite direction of movement of said actuating member.

A further object is to provide an apparatus of the character described wherein the sand applying means comprises a bin for containing a quantity of sand, a chute communicating with a lower portion of sand bin and extending downwardly therefrom, said chute having a sand discharge opening at its lower end located directly above the arbor mounted in said mounting means, and means for feeding sand from said bin to said chute to be discharged from the latter onto the exterior surface of the arbor as the latter is being rotated, said sand feed means further comprising sand agitating means within the bin for stirring the sand therein, and rotatable feed roll means for moving the sand from the lower end of the bin into the upper end of the chute.

Another object is to provide an apparatus of the character described wherein said knife means comprises a longitudinal main knife having a cutting edge, a pair of knife adapters each having a cutting edge, and means removably mounting said knife adapters to opposite ends of said main knife, whereby said knife adapters may be replaced by other pairs of adapters of varying sizes to adapt the knife means to varying sizes of arbors.

A further object is to provide that said knife mounting means comprises a longitudinal knife-holder, means adjustably securing said main knife to said holder in any selected one of several variable positions thereon, and means mounting said knife-holder for reciprocal sliding movement toward and away from said arbor mounted on said arbor mounting means, a cylinder having a fluid actuated reciprocal piston therein connected to said knife-holder, and solenoid valve means controlling the flow of fluid to said cylinder and actuated by the automatic control means.

Other objects and advantages of the present invention are inherent in the structure as disclosed and claimed or will become apparent to those skilled in the art as the detailed description proceeds in connection with the accompanying drawings wherein:

Figure 13:
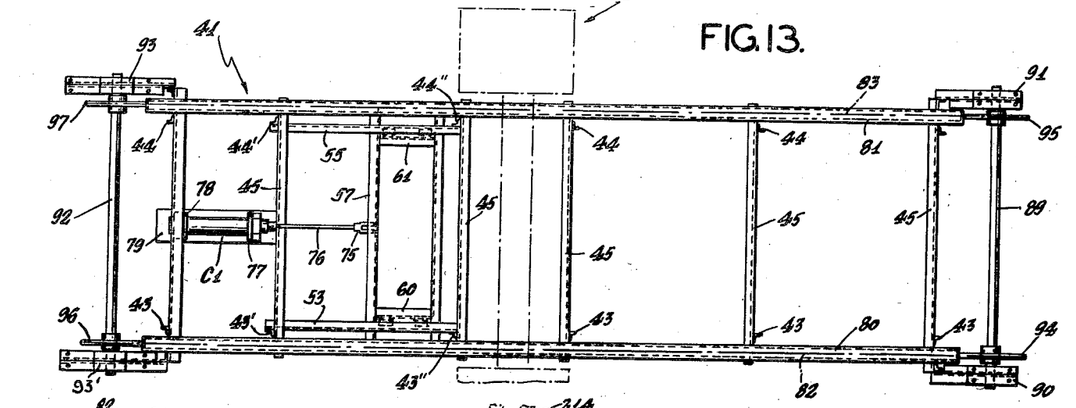
Fig. 13 is a top plan view showing the conveyor structure for feeding the arbors through the apparatus.
Figure 14:
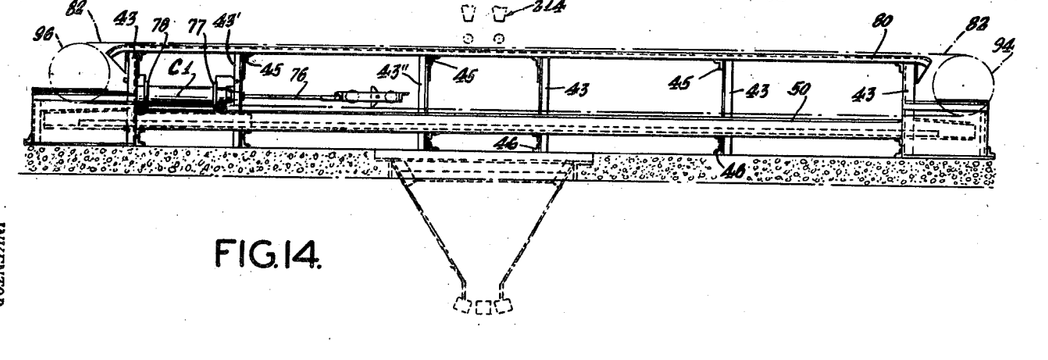
Fig. 14 is a side elevational view of the conveyor structure.

Referring first to Figs. 13 and 14, the apparatus embodying the present invention comprises a longitudinally extending conveyor structure indicated generally by the reference numeral 41 for carrying arbors in series through the apparatus. At an intermediate portion of conveyor structure 41 and extending transversely thereto is a structure indicated generally at 42 for rotatably mounting the arbors as they are conveyed thereto by the conveyor structure 41. As the arbors are rotated by structure 42, sand is poured on the exterior surfaces of the arbors, and structure 42 includes knife means to be described below for shaping the coating of sand thus formed on the arbors.

As shown in Figs. 13 to 16, conveyor structure 41 comprises a frame having a series of spaced vertical column elements 43 along one side thereof and a second series of column elements 44 along the opposite side. The respective column elements 43, 44 are joined at their upper ends by a series of horizontally extending brace elements 45 and at their lower ends by a similar series of brace elements 46. Elements 43, 44, 45, 46 are preferably in the form of angle irons. A series of transverse brace members 47, also of angular shape in cross section, are secured to the vertical leg portions 46' of elements 46 and are provided with horizontal leg portions 47' to which are fixed along the opposite ends thereof a pair of longitudinally extending channel members 48.

The latter extend along the opposite sides of conveyor structure 41. A pair of angle members 50 are each secured to a respective one of channel members 48 and are held in spaced parallel relation thereto by spacer blocks 51 therebetween. A pair of horizontally-extending vertically-spaced channel members 53, 54 are secured at their opposite ends to two of the vertical column elements 43', 43''. A similar pair of channel members indicated at 55 are secured to column elements 44', 44''. The four channel members indicated at 53, 54, 55 provide a track means for mounting a reciprocating carriage structure indicated generally by the reference numeral 56.

Figure 16:
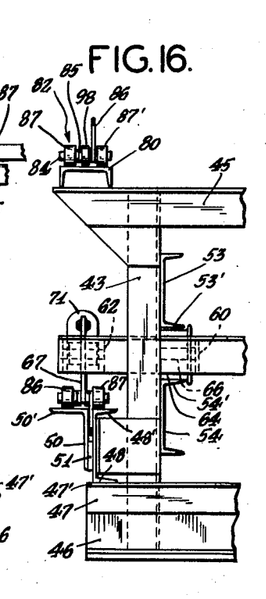
Fig. 16 is an end elevational view of the arrangement shown in Fig. 15.
Figures 18, 19:
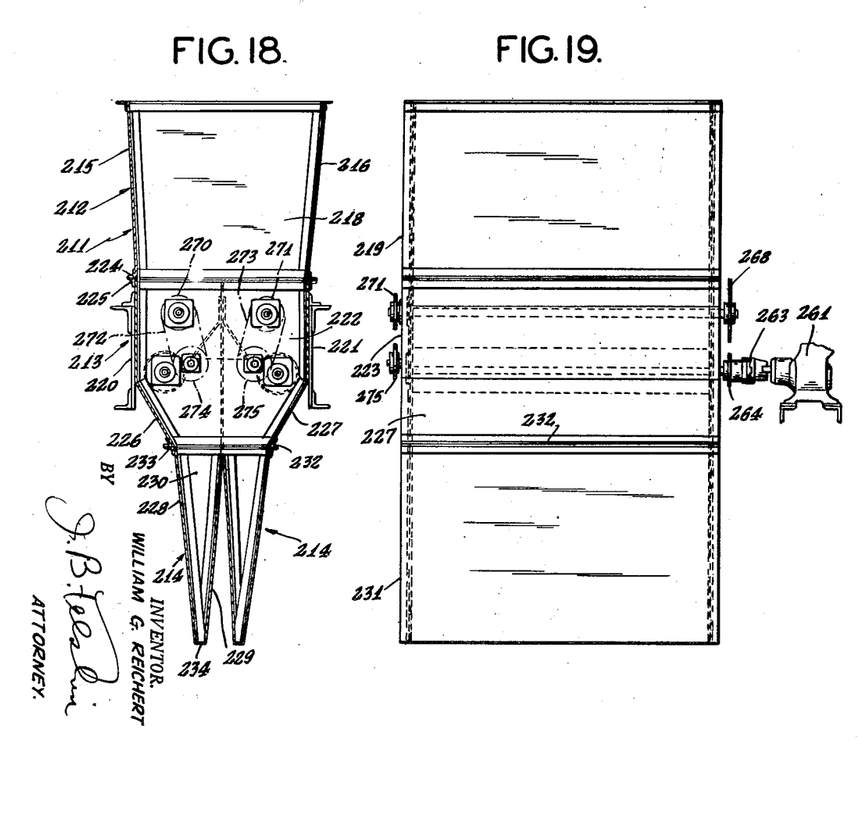
Fig. 18 is a transverse sectional view showing the bin and chute arrangement for feeding the core sand to a pair of arbors as the latter are being rotated.
Fig. 19 is a side elevational view of the structure shown in Fig. 18.
Figure 20:
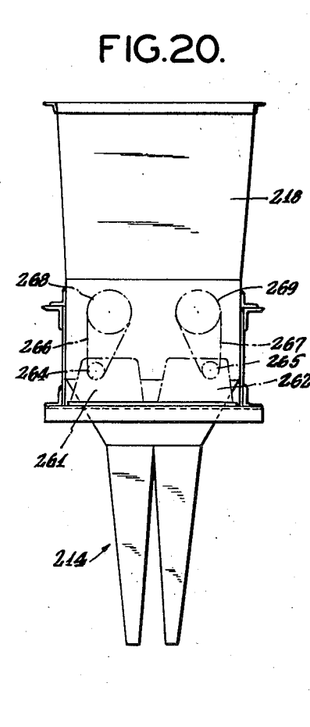
Fig. 20 is an end elevational view of the bin and chute arrangement.

Carriage structure 56 comprises a pair of transverse angle elements 57, 58 secured adjacent their opposite ends to longitudinally extending angle elements 60, 61. The outer ends of angle elements 57, 58 are connected by a pair of longitudinal channel members 62. A pair of cylindrical drums 63, 64 are rotatably mounted to angle element 60 by means of pivot pins 65, 66. The opposite side of carriage structure 56 is similarly provided with another pair of drums rotatably mounted to angle element 61. As best seen in Fig. 16, the drums 63, 64 are adapted to roll along the trackway provided by the upper horizontal flange 54' of channel member 54 and the lower horizontal flange 53' of channel member 53. The other pair of drums on the opposite side of carriage structure 56 is similarly engaged with channel members 55. It will thus be seen that carriage structure 56 is reciprocally movable in longitudinal direction.

A triangular-shaped ratchet dog is pivotally mounted on a pin 68 extending through the opposite vertical legs of channel member 62. It will be understood that a similar dog is provided at the opposite side of carriage structure 56. Each dog 67 is provided with an upper apex or ear 69 adapted to abut against a set screw 70 adjustably mounted within a bracket 71 fixedly secured to channel member 62. It will thus be seen that dog 67 may rotate in a clockwise direction as viewed in Figure 15 but is prevented from rotation in a counter-clockwise direction by set screw 70. The lower ear 72 of each dog 67 is adapted to engage a respective one of a pair of conveyor chains in a manner to be described below.

A lug 73 is secured to an intermediate portion of angle element 57 and is pivotally connected at 74 to a clevis yoke 75 secured to the outer end of a piston rod 76. The opposite end of rod 76 is connected to a piston reciprocally slidable within an indexing air cylinder indicated at C1. The latter is supported by brackets 77, 78 mounted on a horizontal support 79 secured at its forward and rear ends to the upper horizontal leg portions 47' of a pair of adjacent transverse angle elements 47. Air cylinder C1 may be actuated to reciprocate carriage structure 56 in a manner to be described below.

A pair of inverted channel members 80, 81 are secured to the opposite ends of transverse brace elements 45 and extend substantially the entire length of conveyor structure 41 along both sides thereof. Each of the channel members 80, 81 provides a support for the upper run of a respective one of a pair of continuous conveyor chains indicated generally at 82, 83. Each conveyor chain comprises a series of pins 84 interconnected by horizontally-extending links 85 pivoted thereto. The outer opposite ends of pins 84 have a pair of rollers 87, 87' rotatably mounted thereon.

A series of arbor supports 86 are pivotally connected at their opposite lower ends to pins 84. Each arbor support 86 is provided with a V-shaped notch 86a extending downwardly from its upper edge for receiving one of the ends of an arbor. A roller 98 is rotatably mounted on each of pins 84 at an intermediate portion thereof and is adapted to be engaged by dogs 67. The rollers 87, 87' ride along the upper surfaces of channel members 80, 81. Along the lower or return run of each conveyor chain 82, 83 the rollers 87, 87' ride along the upper horizontal flanges 48', 50' of channel member 48 and angle member 50 with arbor supports 86 extending downwardly into the space between the latter.

At the forward or right hand end of conveyor structure 41 as viewed in Figure 13, a horizontal shaft 89 is rotatably mounted at its opposite ends in bearings 90, 91. Another horizontal shaft 92 is rotatably mounted at the rear end of conveyor structure 41 in bearings 93, 93'.

A pair of sprocket wheels 94, 95 are fixedly secured to opposite ends of shaft 89 and another pair of sprocket wheels 96, 97 are secured to opposite ends of shaft 92. Conveyor chain 82 extends around and engages sprocket wheels 94, 96 and conveyor chain 83 similarly engages sprocket wheels 95, 97.

Figures 15, 17:
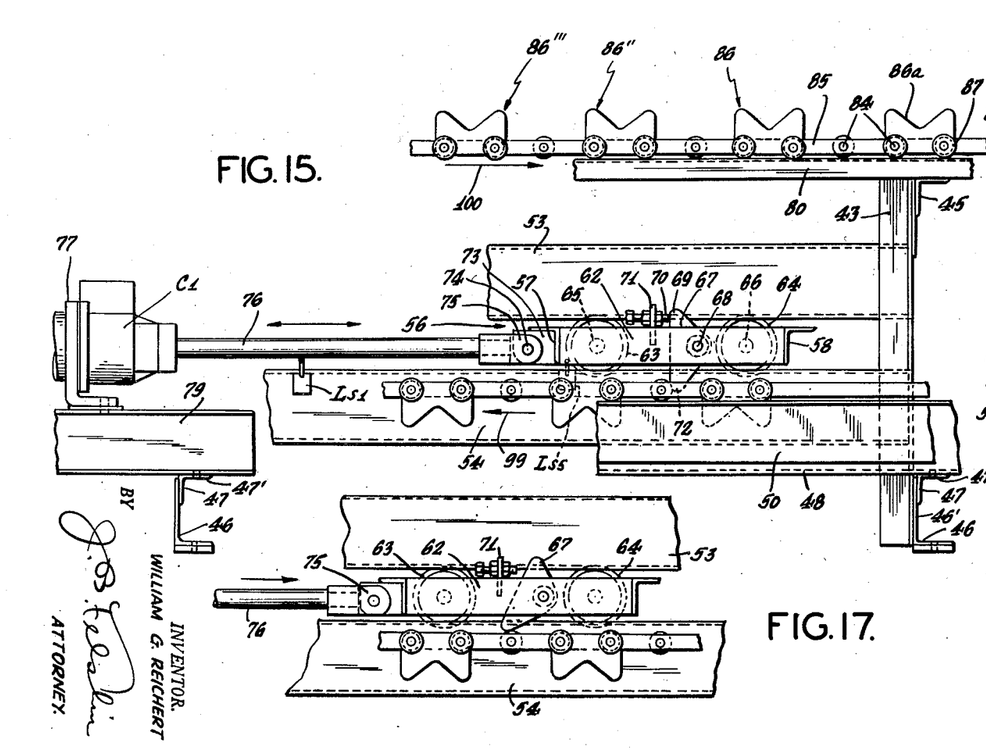
Fig. 15 is an elevational view showing the means for actuating the conveyor of Figs. 13 and 14.
Fig. 17 is a view showing the ratcheting action of one of the dogs which engage the conveyor chain, the dog being shown in the ratcheting position as distinguished from the engaging position shown in Fig. 15.

When indexing air cylinder C1 is actuated to move carriage structure 56 in an outward forward direction (to the right as viewed in Figures 13 to 15), dogs 67 will rotate in a clock-wise direction toward the angular position shown in Figure 17 so as to ratchet over the rollers 98. The conveyor chains 82, 83 thus remain stationary during this outward movement of carriage structure 56. However, when air cylinder C1 is actuated to move carriage structure 56 inwardly or toward the left as viewed in Figures 13 to 15, both dogs 67 will abut against the respective set screws 70 so as to be maintained in the vertical position shown in Figure 15. The lower ear 72 of each dog 67 will engage one of the rollers 98 and move the conveyor chains 82, 83 toward the left in the direction indicated by the arrow 99. The stroke of the piston within air cylinder C1 is of a length to index conveyor chains 82, 83 a distance equal to twice the spacing of adjacent arbor supports 86 whereby the upper runs of conveyor chains 82, 83 will be indexed to the right as indicated by arrow 100 to bring arbor support 86" to the position formerly occupied by arbor support 86 and to bring arbor support 86" into the position formerly occupied by arbor support 86'.

Figure 1:
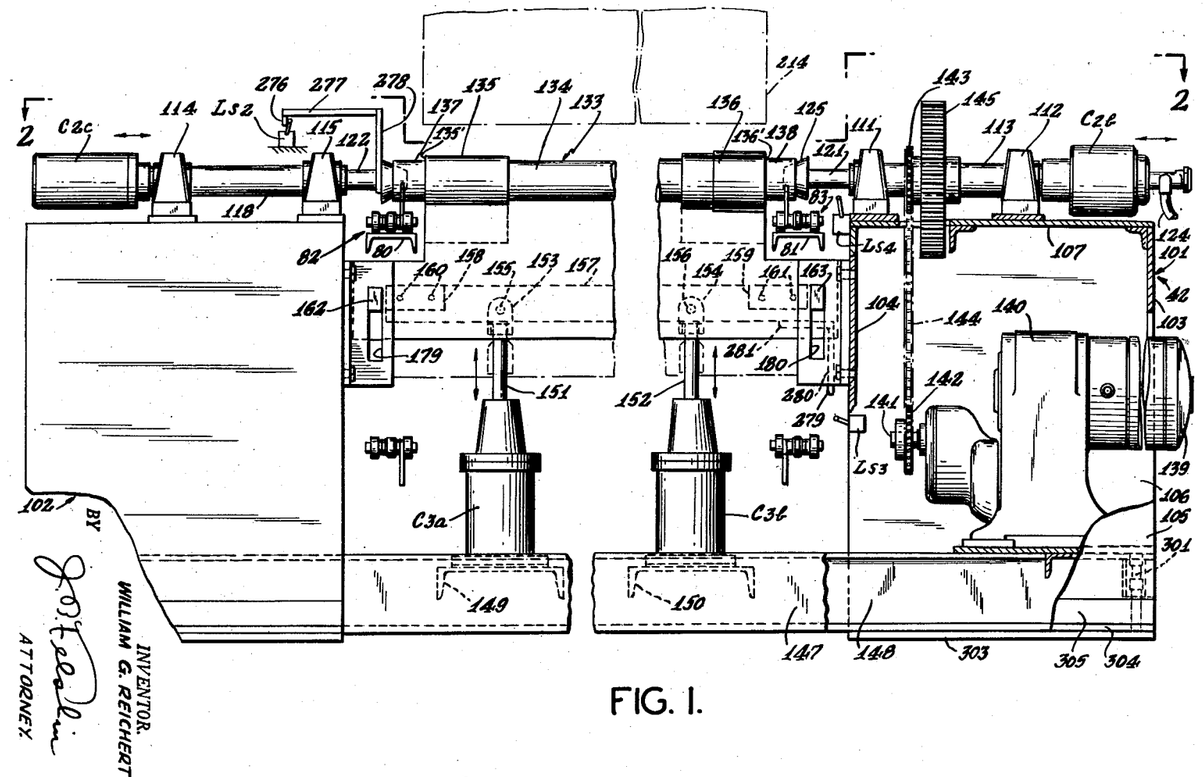
Fig. 1 is a transverse vertical sectional view through a preferred embodiment of the apparatus.
Figures 2, 3, 23, 24, 25, 26, 27, 28, 29:
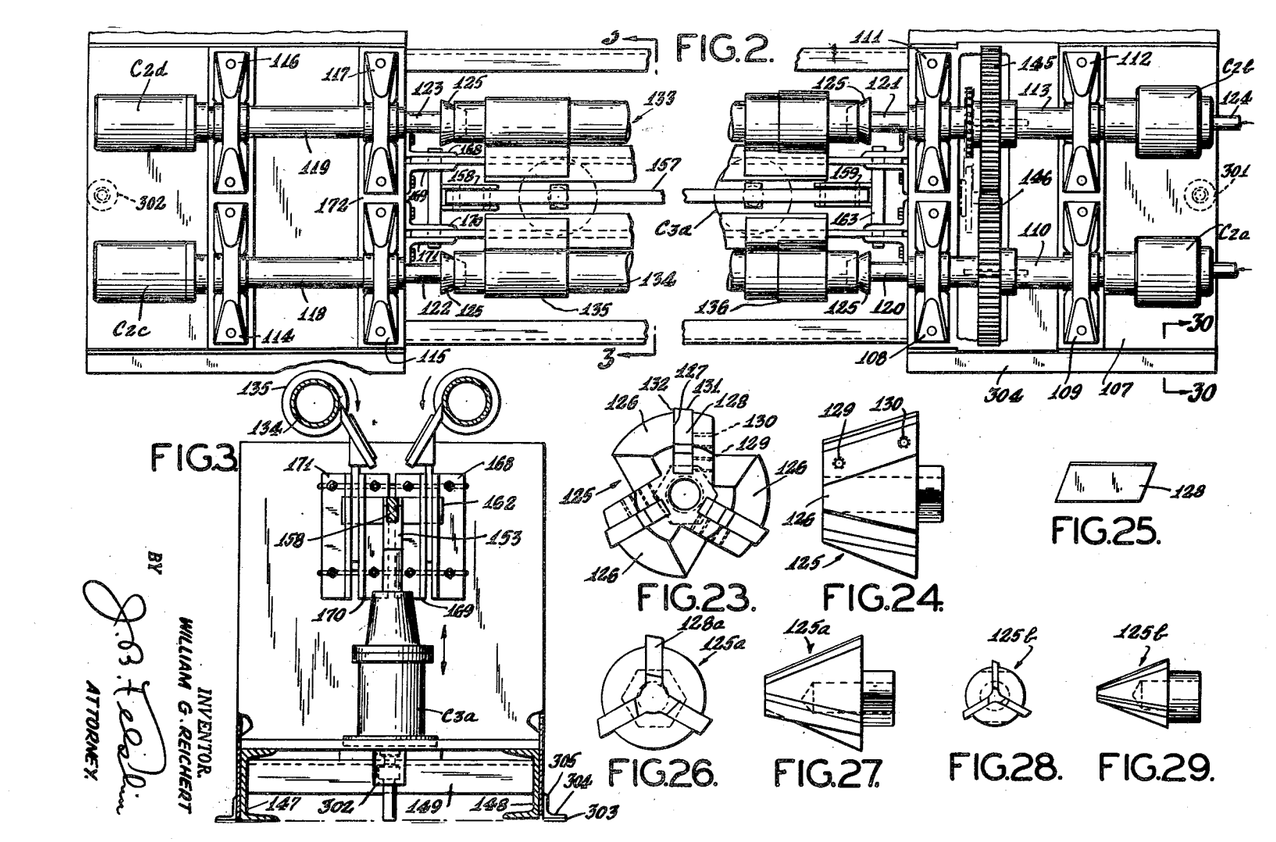
Fig. 2 is a horizontal sectional view on line 2—2 of Fig. 1.
Fig. 3 is a vertical sectional view on line 3—3 of Fig. 2.
Fig. 23 is an end view of one of the members which engage the opposite ends of the arbor for rotatably mounting the latter, the center member shown in this figure being employed with arbors of a size for casting soil pipes of a four inch diameter.
Fig. 24 is a side view of the center member shown in Fig. 23.
Fig. 25 is a detail view of one of the gripping blades of the center member shown in Figs. 23 and 24.
Fig. 26 is an end view showing a modified form of a center member for engaging intermediate size arbors employed in casting soil pipes of a three inch diameter.
Fig. 27 is a side view of the center member of Fig. 26.
Fig. 28 is an end view of a still smaller center member for engaging arbors employed in casting soil pipes of a two inch diameter.
Fig. 29 is a side view of the center member shown in Fig. 28.
Figure 4:
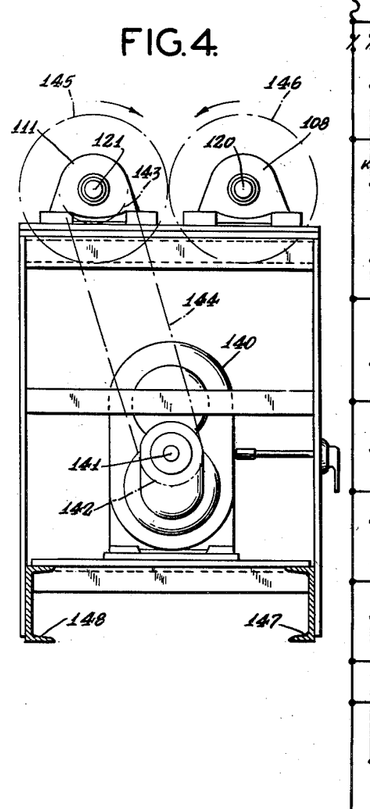
Fig. 4 is an end elevational view of the apparatus, somewhat schematic, with the end cover removed.

Referring now to Figures 1 to 3 inclusive, the structure 42 for rotatably mounting the arbors and applying a knife forming means thereto as the sand is coated thereon will now be described. Structure 42 comprises a pair of spaced hollow housings 101, 102 on opposite sides of conveyor chains, 82, 83. Each housing 101, 102 comprises a pair of side walls 103, 104 joined to a pair of end walls 105, 106 and a top wall 107. A pair of aligned pillow blocks 108, 109 are mounted on top wall 107 of housing 101 and are provided with suitable bearings for rotatably mounting a spindle 110. A second pair of pillow blocks 111, 112 are mounted on top wall 107 for rotatably mounting a second spindle 113 extending parallel to spindle 110.

Two pairs of aligned pillow blocks 114, 115 and 116, 117 are mounted on the top wall of housing 102 and contain bearings for rotatably mounting a pair of horizontal parallel spindles 118, 119 respectively. Spindle 118 is in axial alignment with spindle 110 and spindle 119 is in axial alignment with spindle 113. Each of the spindles 110, 113, 118, 119 is hollow and is provided with a shaft indicated at 120, 121, 122, 123 respectively extending therethrough and longitudinally slidable therein. The outer end of each shaft 120 to 123 is connected with a piston (not shown) reciprocally slidable within a respective one of four rotary air cylinders C2a, C2b, C2c and C2d. Each air cylinder C2 is mounted on the outer end of its respective spindle and is provided with an air supply conduit 124 for supplying air thereto and actuating the piston therein.

The inner end of each of the shafts 120 and 123 is provided with a tapered center member 125. As best seen in Figures 23 to 25, each center member 125 is of frusto-conical configuration and comprises three radially projecting portions 126 each having a radially extending slot 127 receiving a gripping detent or blade 128. The blades 128 are maintained in fixed adjusted position within slots 127 by set screws 129, 130, the latter enabling the blades 128 to be adjusted within slots 127 so as to project outwardly to the proper extent. The outer end 131 of each detent 128 projects outwardly from the tapered conical surface of each radial portion 126 and is beveled to provide a sharp edge 132 adapted to bite into a conical interior surface formed in the outer end of an arbor which it engages.

The arbors are indicated generally by the reference numeral 133 and each comprises an intermediate cylindrical portion 134 having adjacent the opposite ends thereof enlarged cylindrical shoulder portions 135, 136. The extreme outer ends of each arbor 133 are in the form of cylindrical shaft portions 137, 138 each having a conical opening in its end face into which opening projects a respective one of the conical center members 125. It will thus be seen that each arbor 133 is adapted to be gripped at its opposite ends by a pair of center members 125 on one of the aligned pairs of shafts 120, 122 or 121, 123, two arbors 133 being thus rotatably mounted simultaneously.

An electric motor 139 is drivingly connected to a variable transmission 140 having an output shaft 141 to which is fixedly secured a sprocket wheel 142. Another sprocket wheel 143 is fixedly secured to spindle 113 and is drivingly connected to sprocket wheel 142 by a chain 144. A gear 145 is also secured to spindle 113 and is in driving engagement with a gear 146 fixed to spindle 110. It will thus be seen that actuation of electric motor 139 causes rotation of spindles 110, 113 through transmission 140, sprocket wheel 142, chain drive 144, sprocket wheel 143 and spur gears 145, 146. Since shafts 120, 121 are nonrotatably mounted with respect to spindles 110, 113, actuation of electric motor 139 causes rotation of arbors 133.

The base of structure 42 comprises a pair of spaced horizontal channel beams 147, 148. A pair of inverted channel member 149, 150 extend between beams 147, 148 and are secured thereto. Mounted on channel members 149, 150 are a pair of air cylinders C3a, C3b having their axes extending vertically. Each of the air cylinders C3 is provided therein with a reciprocating piston connected to a piston rod 151, 152. The upper ends of the latter are each provided with a clevis 153, 154 pivotally connected at 155, 156 to a horizontally extending connecting bar 157. The latter has opposite ends extending between plates 158, 159 and secured thereto by screws 160, 161. Plates 158, 159 are welded along their outer edges to a pair of horizontally extending slide members 162, 163 each of rectangular shape in cross-section.

Figures 5, 30, 31:
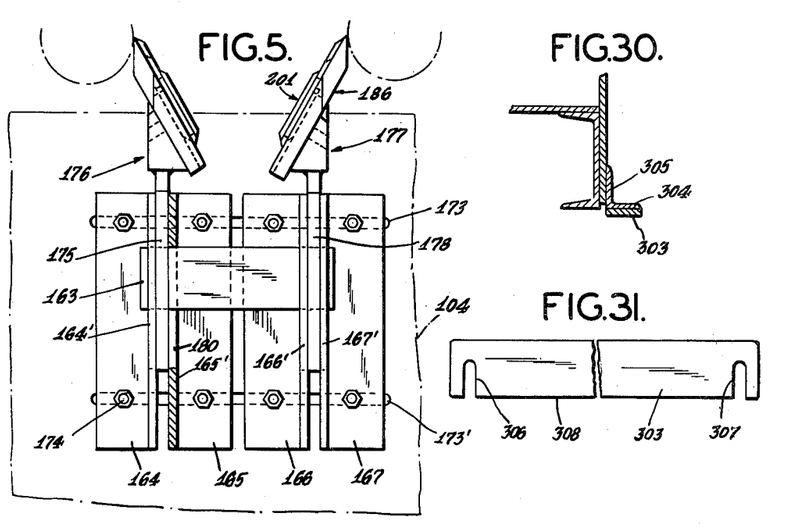
Fig. 5 is an enlarged detail view of a portion of Fig. 3.
Fig. 30 is a partial sectional view on line 30—30 of Fig. 2 and shows a shim for raising or lowering the height of the apparatus to adapt the latter for different size arbors.
Fig. 31 is a detail view of one of the shims.

As best seen in Figure 5, two pairs of angle members 164, 165 and 166, 167 are mounted on the exterior surface of the inner side wall 104 of housing 101. Two other pairs of angle elements 168, 169 and 170, 171 are mounted to the inner side wall 172 of housing 102. Side wall 104 is provided with a pair of horizontally extending slots 173, 173' through which extend bolts 174 for securing the angle members 164 to 167 to the side wall 104. The angle elements 168 to 171 are similarly secured to side wall 172 of housing 102.

The outwardly projecting leg portions 164' and 165' of angle elements 164, 165 are in spaced adjacent relationship so as to provide therebetween a channel for slidably mounting one end of the shank 175 of a knife-holder indicated generally at 176. A second knife-holder 177 is provided with a shank 178 having one end slidably received within the vertical leg portions 166', 167' of angle elements 166, 167. Both knife-holders 176, 177 extend in parallel relation between housings 101, 102 and the other ends of the knife-holders 176, 177 are similarly slidably mounted between the projecting leg portions of angle elements 168 to 171 mounted on housing side wall 172, as best seen in Figures 1 and 2.

Each of the angle element projecting leg portions is provided with a vertical slot extending therethrough as indicated at 179, 180. Slide bars 162, 163 extend through the slots 179, 180 and are vertically slidable therein. It will thus be seen that the entire knife structure comprising knife-holders 176, 177, slide bars 162, 163 and connecting bar 157 is slidably mounted for vertical reciprocal movement and is actuated in upward and downward directions by the air cylinders C3.

Figure 9:
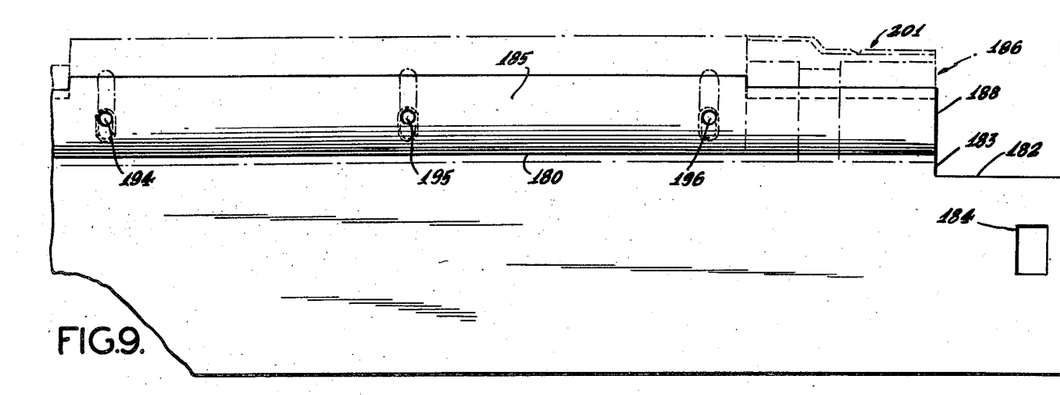
Fig. 9 is a side elevational view of the assembled knife structure comprising the knife-holder with the main knife and adapters assembled thereto.
Figure 10:
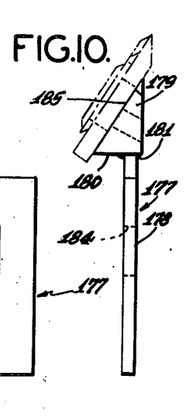
Fig. 10 is an end elevational view of the knife structure shown in Fig. 9.

Referring now to Figures 9 and 10, each of the knife-holders 176, 177 comprises an upper portion 179 which extends longitudinally in a horizontal direction and is of triangular shape in cross-section. The base surface 180 of triangular portion 179 is secured to the upper edge of the shank 178 by welding at 181. The shank 178 is in the form of a flat longitudinally-extending plate, the opposite outer ends of which are provided with recessed shoulder portions at 182 along the upper edges thereof. The opposite ends of each triangular portion 179 are flush with the vertical shoulder surfaces 183. A rectangular slot indicated at 184 extends through each shank 178 adjacent the opposite ends thereof for receiving the slide bars 162, 163.

Figure 11:
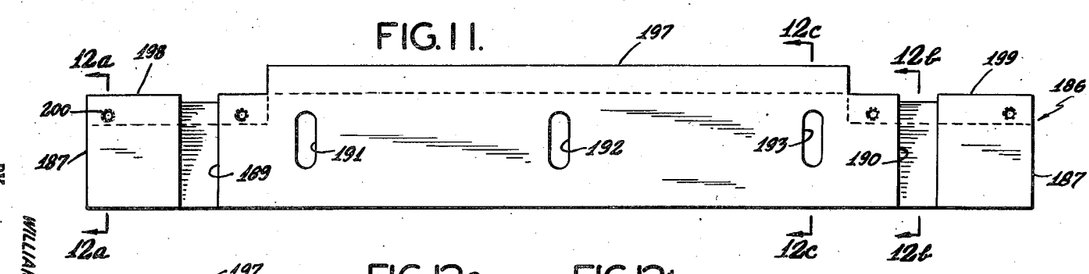
Fig. 11 is a side elevational view of the main knife detached from the knife-holder and knife-adapters.
Figure 12:
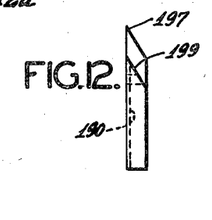
Fig. 12 is an end elevational view of the main knife.

Mounted on the angularly-extending surface 185 of the triangular portion 179 of each of the knife-holders 176, 177 is a main knife indicated generally by the reference numeral 186 and best shown in Figures 11 and 12. The opposite ends 187 of each of the knives 186 lies flush with the respective shoulder surface 183 of shank 178 and also the end surface 188 of triangular portion 179 of its respective knife-holder 176 or 177. Adjacent the opposite ends of each knife 186 there is formed a vertically-extending recess at 189, 190.

Figure 12A:
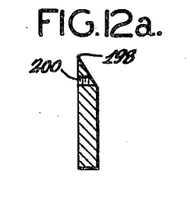
Figs. 12a, 12b and 12c are vertical sectional views taken on lines 12a—12a, 12b—12b, and 12c—12c, respectively, of Fig. 11.
Figure 12B:
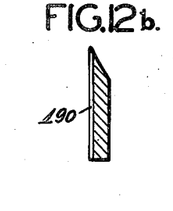
Figure 12C:
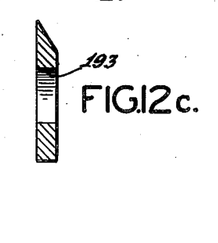

A series of three vertical slots 191, 192, 193 extend through each knife 186 and are adapted to receive the shanks of screws 194, 195, 196 which secure the knife 186 to the triangular portion 179 of knife-holder 176 or 177. The intermediate portion of the knife 186 is provided with an upper edge 197 which projects above the edges 198, 199 at the opposite ends thereof. As best seen in Figure 12, the edges 197, 198, 199 are beveled. As shown in Figure 12a, a series of threaded holes 200 are provided in the opposite end portions of knife 186 adjacent the upper edges 198, 199 thereof. The threaded holes 200 receive screws for securing a pair of knife adapters 201 to the opposite ends of each of the main knives 186, 187.

Figure 6:
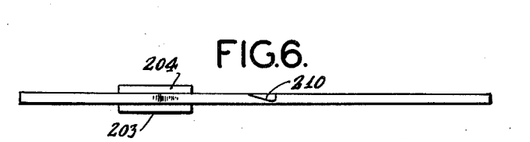
Fig. 6 is a top plan detail view of one of the knife adapters.
Figures 7, 8:
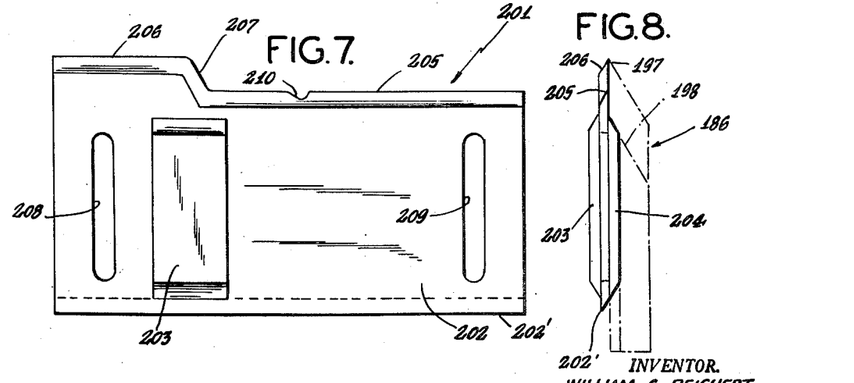
Fig. 7 is a side elevational view of the knife adapter.
Fig. 8 is an end elevational view of the knife adapter with the main knife indicated in dash-dot lines.

The knife adapters 201 are best shown in Figures 6 to 8 inclusive and each comprises a flat planar body portion 202 having a pair of lugs 203, 204 projecting outwardly from the opposite surfaces thereof. The lugs 203, 204 are of rectangular shape and are each adapted to fit into a respective one of the grooves or recess 189, 190 formed in each of the main knives 186. The upper edge of each knife adapter 201 is provided with a lower horizontal edge portion 205 and an upper edge portion 206 joined thereto by an angularly extending shoulder portion 207. A pair of vertical slots 208, 209 are provided to receive the screws which engage the threaded holes 200 in the main knife 186 to secure the knife adapters 201 thereto.

When the knife adatpers 201 are assembled to the knife 186 as shown in Figure 8, the upper edge 206 of each adatper 201 projects above the corresponding upper edges 198, 199 of the knife 186. The lower edge 205 of each adapter 201 also projects above the knife edges 198, 199. The edges 205, 206 are beveled to increase their sharpness and co-act with the edge 197 of knife 186 to provide a cutting or forming action on the sand which is coated on the exterior surfaces of the arbors 133 in a manner to be described below. The edges 197, 205, 206 thus shape the exterior countour of the sand coating. Each edge 205 is provided with a recess 210 for forming a circumferentially-extending ridge of sand on the arbors 133.

The hopper structure 211 for applying sand to the exterior surfaces of the arbors 133 as the latter are being rotated is shown in Figures 18 to 22 inclusive and comprises an upper bin portion 212, a lower bin portion 213 and a pair of chute portions 214. Upper bin portion 212 comprises side walls 215, 216 joined to end walls 218, 219 to form a hollow enclosure into which sand is fed by any suitable device. Lower bin portion 213 comprises side walls 220, 221 joined to end walls 222, 223. The upper end of lower bin portion 213 is open and communicates with the lower open end of upper bin portion 212 secured thereto by flanges 224, 225.

The lower portions of side walls 220, 221 are tapered downwardly and inwardly at 226, 227 toward the lower open end of bin portion 213. Each of the chutes 214 comprises a pair of side walls 228, 229 converging toward each other in a downward direction and joined to a pair of vertical end walls 230, 231. The upper ends of chutes 214 are open and communicate with the lower open end of bin portion 213 to which the chutes 214 are joined by flanges 232, 233. The lower ends 234 of chutes 214 are open and provide discharge openings through which the sand is ejected onto the rotating arbors 133. As shown in Figure 14, each of the chutes 214 is located directly above a respective one of a pair of rotating arbors 133.

An agitator shaft 235 extends horizontally through the interior of lower bin portion 213 and is provided with opposite ends rotatably mounted in bearings 236, 237 mounted on end walls 222, 223 respectively. Secured to agitator shaft 235 and extending radially outwardly therefrom are a series of agitating elements 238. A second agitator shaft 239 similarly extends through the interior of lower bin portion 213 and is arranged in horizontally spaced relation with respect to agitator shaft 235. The interior of lower bin portion 213 is divided into two compartments by a vertical dividing plate 240 extending in a central plane thereof, each of the agitator shafts 235, 239 being located in one of the compartments.

Figure 21:
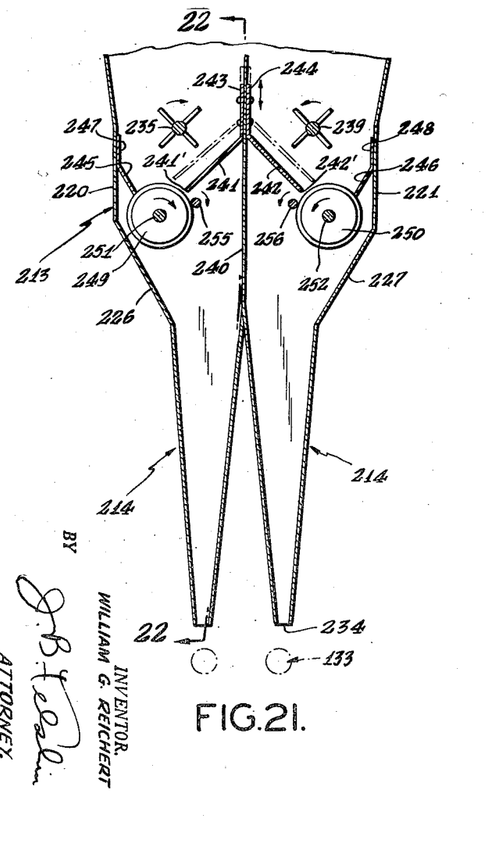
Fig. 21 is a transverse sectional view through the bin and chutes showing the agitating shafts and the sand feeding rolls.
Figure 22:
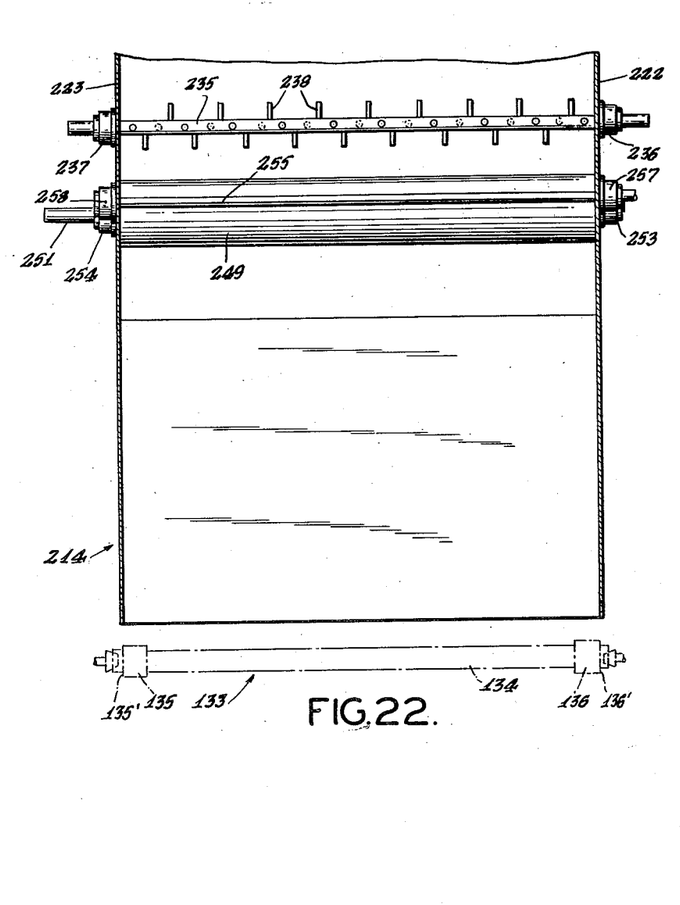
Fig. 22 is a vertical sectional view on line 22—22 of Fig. 21.

A pair of angularly extending baffle plates 241, 242 are provided with vertical flanges 243, 244 secured to the upper portion of dividing plate 240 and are adjustably movable thereon so as to regulate the position of baffle plates 241, 242 as indicated by the dash-dot lines in Figure 21. Another pair of baffle plates 245, 246 are provided with flanges 247, 248 secured to the side walls 220, 221 respectively of lower bin portion 213. Baffle plates 245, 246 extend downwardly and inwardly and their lower edges lie adjacent the exterior cylindrical surfaces of a pair of large sand feed rolls 249, 250 having reduced end shafts 251, 252 journaled in bearings 253, 254 mounted on the end walls 222, 223. A pair of small rolls 255, 256 extend horizontally across the interior of bin portion 213 and are located adjacent the exterior cylindrical surfaces of large rolls 249, 250 respectively. Rolls 255, 256 are likewise rotatably mounted in bearings 257, 258 secured to end walls 222, 223.

The lower edges of baffle plates 245, 246 practically engage the exterior surfaces of large rolls 249, 250 whereas the lower edges 241', 242' of baffle plates 241, 242 are spaced from the exterior surfaces of rolls 249, 250 so as to provide a space or passageway therebetween through which the sand may flow. Agitator shaft 235 and feed rolls 249, 250 are rotated in a clockwise direction as viewed in Figure 21, whereas agitator shaft 239 and feed rolls 250, 256 are rotated in a counter-clockwise direction. As the agitator shafts 235, 239 rotate they agitate the sand within bin portion 213 so as to break up the sand lumps and maintain the sand in an aerated flowable condition.

The large feed rolls 249, 250 move the sand inwardly toward the passageways between the rolls 249, 250 and the lower edges 241', 242' of baffle plates 241, 242. The sand then flows inwardly over feed rolls 255, 256 and then drops into the chutes 214 and through the discharge openings in the lower open ends 234 of the latter onto the pair of rotating arbors 133. It will be seen in Figures 1 and 22 that the lengths of the discharge openings 234 are substantially equal to the distances between the outer shoulder surfaces 135', 136' of the enlarged shoulder portions 135, 136 of each of the arbors 133. Thus the intermediate portion 134 and the enlarged shoulder portions 135, 136 of both arbors 133 will be coated with sand being discharged from chutes 214.

In order to rotate the agitator shafts 235, 239 and feed rolls 249, 250 and 255, 256, a pair of vari-speed electric motors 261, 262 are drivingly connected by a suitable coupling as at 263 to each of the end shafts 251, 252 of the large feed rolls 249, 250 respectively. A pair of sprocket wheels 264, 265 are fixed to shafts 251, 252 and drivingly engage a pair of chain drives 266, 267 which in turn engage sprocket wheels 268, 269, fixedly secured to agitator shafts 235, 239 at one end of each of the latter. The opposite ends of agitator shafts 235, 239 have sprocket wheels 270, 271 fixed thereto and engaging chain drives 272, 273 which drivingly engage a pair of sprocket wheels 274, 275 fixed to the small feed rolls 255, 256.

The electrical control system for actuating the various operative components of the apparatus in properly timed sequence will now be described. Referring again to Figure 15, a limit switch LS1 is mounted to channel member 54 and is adapted to be actuated when engaged by carriage structure 56 when the latter is moved by air cylinder C1 inwardly or to the left as viewed in this figure. Another limit switch LS5 is fixed to channel member 54 and is actuated by carriage structure 56 when the latter is in its extreme extended position to the right as viewed in Figure 15.

Referring now to Figure 1, a limit switch designated LS2 is fixed with respect to structure 42 and is actuated by an engaging finger 276 fixed to an arm 277 mounted on a bracket 278 which is in turn fixedly secured to shaft 123 of spindle 119. When air cylinders C2c and C2d are actuated to move shafts 122, 123 outwardly to engage the ends of arbors 133, the structure comprising bracket 278, arm 277 and finger 276 will be moved outwardly therewith to actuate limit switch LS2 at the extreme outward or arbor engaging position of shafts 122, 123.

Another limit switch LS4 is mounted to the upper edge of side wall 104 of housing 101 and is actuated by contact with center 125 on shaft 121 when said shaft 121 has been moved to the extreme outward position to the right as viewed in Figure 1 by air cylinder C2b. Also secured to side wal 104 at an intermediate portion thereof is another limit switch LS3 which is actuated by contact with the downwardly extending leg portion 279 of an angle member 280 secured along its horizontal leg portion 281 to one end of the connecting bar 157. This contact between portion 279 and limit switch LS3 is made when the knife structure comprising connecting bar 157, knife-holders 176, 177, knives 186 and knife adapters 201 has been moved downwardly to its lowermost position by air cylinders C3a and C3b.

At the start of the operation of the apparatus, the knife structure is in its lowermost position and mandrel shafts 120 to 123 are in their outward or retracted positions. A shown in Figure 1, this causes limit switches LS3 and N. O. LS4 to be closed. Air cylinder C1 must also be in a condition whereby carriage structure 56 is in its outward or extended position to close limit switch LS5.

Referring to Fig. 31, a circuit is thus established through LS3, N. O. LS4 and LS5 to energize the solenoid valve SV–1R which controls the flow of air to cylinder C1, thereby moving carriage structure 56 to the left in the direction of arrow 99 as viewed in Fig. 15. This causes the lower ears 72 of ratchet dogs 67 to engage rollers 98 and index conveyor chains 82, 83 a distance equal to twice the spacing of arbor suports 86. The arbors 133 are placed on the arbor supports 86 at the left-hand end of conveyor structure 41 either manually or by any suitable loading device. By this indexing movement of conveyor chains 82, 83 caused by actuation of air cylinder C1, the two arbors 133 formerly located between the two pairs of aligned centers 125 are moved forwardly away from said centers 125 and two new arbors are moved into coaxial alignment with centers 125.

At the end of the inward movement of carriage structure 56, limit switch LS1 is closed, thereby establishing a circuit through limit switch LS3, normally open limit switch N. O. LS4, and limit switch LS1 to solenoid valve SV–2E. The latter controls the flow of air to the four rotary cylinders C2 to cause the shafts 120 to 123 to be urged outwardly of spindles 110, 113, 118, 119 and toward each other, thereby causing the respective centers 125 to engage the ends of the arbors 133. It will be noted that cylinders C2b and C2a are of a larger diameter than cylinders C2c and C2d and therefore exert a greater total force than the latter cylinders since the air pressure within all the cylinders is approximately equal. Therefore shafts 120, 121 will be urged outwardly until the pistons within air cylinders C2b and C2a reach their extreme positions, thereby assuring that arbors 133 are always located in the same predetermined position in the direction along their axes.

When shaft 123 has been moved outwardly, limit switch LS2 is engaged by finger 276 and is closed. A normally closed time relay TR4 is in series with LS2 and the starter of the spinner motor 139, thereby energizing the latter and causing spindles 110, 113 and the respective shafts 120, 121 thereof to be rotated through the drive connection comprising sprocket wheels 142, 143, drive chain 144 and spur gears 145, 146. Closing of limit switch LS2 will also serve to energize time relay TR1.

When the starter of spinner motor 139 closes, a normally-open interlock on the starter closes and in series with the interlock is a normally closed time relay TR2 which is in turn connected with the starters of the sand feed motors 261, 262. The sand is now fed from hopper structure 211 through the lower discharge openings 234 of chutes 214 and onto the exterior surfaces of the pair of rotating arbors 133. The same interlock on the spinner motor starter energizes time relay TR2. Time relay TR1 closes contacts TR1A approximately five seconds after TR1 has been actuated by closing LS2.

Normally-closed time relay TR3 in series with contacts TR1A is closed at this time because time relay TR3 has not yet been actuated, thereby completing a circuit through contact TR1A, normally-closed time relay TR3, and solenoid valve SV–3E. The latter controls the valves which in turn control the air supply to the cylinders C3a, C3b thereby causing the knife structure to be raised by the latter. The closing of contacts TR1A also serves to actuate solenoid valve SV–1E which causes the indexing cylinder C1 to move carriage structure 56 to the right in a ratcheting action as viewed in Figure 15. During this ratcheting-movement of carriage structure 56, the rounded surfaces on the lower ears 72 of ratchet dogs 67 will slide over the rollers 98 of conveyor chains 82, 83 as the ratchet dogs pivot in a clock-wise direction to the angular position shown in Figure 17. Thus the conveyor chains 82, 83 will remain stationary during this outward movement of carriage structure 56.

At the end of approximately eight seconds, time relay TR2 opens the normally-closed contact TR2–T. O. thereby stopping the sand feed motors 261, 262 and closing contacts TR2– T. C. which energizes time relay TR3 in series therewith. After a time interval of approximately two seconds, time relay TR3 opens contacts TR3–T. O. and closes contacts TR3–T. C. This opens the circuit through valve solenoid SV–3E and closes the circuit through valve solenoid SV–3R, thereby actuating air cylinders C3a, C3b to move the entire knife structure downwardly.

Time relay TR4 is also connected in series with contacts TR3–T. C. and is actuated when the latter are closed, thereby immediately closing a pair of instantaneous interlock contacts TR4A. Connected to the latter are the normally-closed contacts N. C. LS4 which remains closed while the centers 125 are in engagement with the ends of arbors 133. A locking circuit is thus established through N. C. LS4 and contacts TR4A to hold a circuit for the operation of time relay TR4 irrespective of the condition of time relay TR3. After a predetermined time interval, time relay TR4 closes contacts TR4–T. C. thereby completing a circuit through valve solenoid SV–2R so as to actuate rotary air cylinders C2 to retract shafts 120 to 123, thereby freeing the pair of arbors 133. The latter may then be carried by the arbor supports 86 on conveyor chains 82, 83 away from their co-axial positions between the centers 125 to allow the next succeeding pair of arbors 133 to be brought into position to be engaged by the centers 125.

Figure 32:
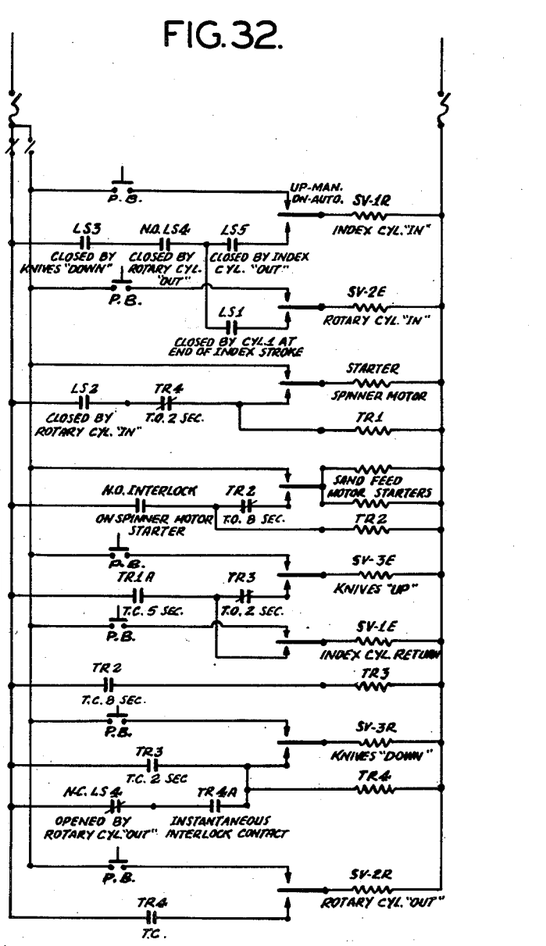
Fig. 32 is a schematic wiring diagram of the electrical circuit for automatically controlling the operation of the apparatus.

Time relay TR4 also opens contacts TR4–T. O. to open the circuit through the starter of spinner motor 139 to stop the latter. Since the shafts 121 to 123 are in their outward disengaged positions, limit switch LS4 will be closed and the above described cycle of operations will be repeated since limit switches LS3 and LS5 are also closed by virtue of the fact that the knife structure is in the "down" position and the index cylinder C1 is in the "out" position thereby closing limit switches LS3 and LS5 to cause index cylinder C1 to move inwardly and commence the entire cycle described above. The circuits must be thrown from "Automatic" to "Hand control" through "Hand," "Off," "Automatic" switches shown at the upper left hand corner of Fig. 32. The push button manual switches are indicated in the circuit of Fig. 32 by the letters PB.

It will be understood that the core sand ejected from chutes 214 onto arbors 133 as the latter are being rotated contains a binder composition which causes the sand to adhere to the exterior cylindrical surfaces of intermediate portion 134 and enlarged shoulder portions 135, 136 of the arbors 133. The edges 197 of the main knives 186 will scrape the sand being coated on the intermediate portion 134 of each arbor whereas the lower edges 205 of the knife adapters 210 will scrape the sand coating being applied to the arbor shoulder portions 135, 136. The angularly-extending cutting edges 207 of knife adaptors 201 will form the sand adjacent the shoulder surfaces 135', 136' of portions 135, 136. If it is desired to form arbor cores of cylindrical configuration throughout and devoid of enlarged shoulder portions, knife adapters 201 may be assembled to knives 186 in an inverted position so that edge 202' of adapters 201 will scrape the exterior sanded surface of the arbors adjacent the opposite ends of the latter, as will be obvious to those skilled in the art.

Since in the casting of soil pipes it is necessary to have different size arbor cores to match various diameters of soil pipes to be cast, the apparatus of the present invention is adapted to accommodate arbors of varying sizes. As shown in Figures 26 and 27, the centers 125a are of conical configuration similar to centers 125 in Figures 23 to 25, except that centers 125a are not cut away to provide radial portions as at 126 in Figure 23. The detents 128a grip the interior surfaces of conical openings formed in the opposite ends of arbors of a size for casting three-inch diameter pipes as distinct from centers 125 which are adapted for gripping larger size arbors to be used in casing four-inch diameter soil pipes. The center 125b shown in Figures 28 and 29 are similar to centers 125a except that they are somewhat smaller in diameter and are adapted to engage a still smaller size arbor to be employed in casting two-inch diameter soil pipes.

When the apparatus of the present invention is employed for sand coating and spinning arbors for three-inch or two-inch diameter pipes, the knife adapters 201 must be removed from main knives 186 and another set of adapters similar to adapters 201 but differing in size and proportion must be substituted therefor. In addition, the entire structure 42 may be raised or lowered as required by the particular size arbor being processed in the apparatus. To accomplish this end, a pair of conventional jack screws 301, 302 are mounted under the outer ends of housings 101, 102 respectively and serve to temporarily raise the entire structure 42 while suitable shims indicated at 303 may be placed under the horizontal flange portions 304 of angle elements 305 mounted along the opposite edges of both housings 101, 102. As shown in Figure 31, each of the shims 303 is in the form of a flat rectangular plate having a pair of slots 306, 307 formed therethrough and extending inwardly from the edge 308 adjacent the opposite ends thereof. The slots 306, 307 are adapted to receive a pair of bolts (not shown) which comprise part of the frame structure of housings 101, 102.

It is to be understood that the specific embodiment of the invention disclosed in the drawings and described above is merely illustrative of one of the many forms which the invention may take in practice without departing from the scope of the invention as delineated in the appended claims. It is intended that the claims be interpreted as broadly as possible in view of the prior art and not be limited by the illustrative embodiment disclosed herein.

Having thus described the invention in some detail, what is claimed is:

1. An apparatus for forming arbor cores and comprising a conveyor means for moving said conveyor for feeding an arbor to a mounting station, means movable into engagement with the ends of the arbor at said station, means controlled by the conveyor moving means for moving said arbor engaging means, means for rotating said arbor engaging means for rotating said arbor, means for applying a coating of sand to the exterior surface of the arbor as it is being rotated including a rotary agitator, means controlled by said rotating means for rotating said agitator, knife means for forming said sand coating to predetermined shape and dimensions as the arbor is being rotated, and means controlled by the operation of said agitator means for controlling the operation of the knife means.

2. An apparatus as recited in claim 1 and comprising a plurality of fluid-actuated means, each for actuating said conveyor means and said knife means and said mounting means, respectively, and electrical control means for automatically actuating said fluid-actuated means in properly timed sequence.

3. An apparatus for forming arbor cores and comprising centering means movable inwardly coaxially toward each other into engagement with the ends of an arbor for rotatably mounting said arbor, means for moving said centering means axially, means for rotating said centering means while said arbor is mounted in said mounting means, means including a rotary agitator, for applying a coating of sand to the exterior surfce of the arbor as it is being rotated, means for rotating said agitator, knife means movable toward said arbor for forming said sand coating to predetermined shape and dimensions.

as the arbor is being rotated, and means for moving said knife means.

4. An apparatus as recited in claim 3 and comprising means for automatically moving the center means axially, rotating the centering means, rotating the agitator and moving the knife means in timed sequence.

5. An apparatus as recited in claim 4 wherein said automatic control means comprises a plurality of fluid-actuated means and a plurality of electric motor means for actuating the means recited above in claim 3, and electrical control means for automatically operating said fluid-actuated means and said electric motor means in properly timed sequence.

6. An apparatus for forming arbor cores and comprising means for rotatably mounting an arbor, conveyor means for successively feeding arbors to and from said mounting means, means for rotating an arbor while mounted in said mounting means, means for applying a coating of sand to the exterior surface of the arbor as it is being rotated, and knife means for forming said sand coating to predetermined shape and dimensions as the arbor is being rotated, said conveyor means comprising a pair of continuous flexible conveyor members, extending in parallel spaced relation and including a plurality of arbor supports at spaced intervals therealong for supporting the opposite ends of a sereis of arbors, an actuating member mounted for reciprocal movement in the direction of said conveyor members, means for reciprocating said actuating member, and means on said actuating member for drivingly engaging said conveyor members in one direction of movement of said actuating member to move said conveyor members therewith, and being drivingly disengaged from said conveyor members in the opposite direction of movement of said actuating member.

7. An apparatus as recited in claim 6 and comprising electrical control means for automatically actuating said reciprocating means in properly timed sequence.

8. An apparatus as recited in claim 6, said arbor mounting means comprising a pair of oppositely-facing axially-aligned spaced center members for engaging the opposite ends of the arbor, and means mounting the center members for rotatable movement about their axes, and also longitudinal movement toward and away from each other in the direction of their axes, said conveyor members extending between said center members to position the arbors successively therebetween in axial alignment with said center members, means for automatically moving said center members toward each other to grip an arbor when said conveyor means has positioned said arbor in said axial alignment therewith, means for automatically actuating said arbor rotating means to rotate said center members and the arbor gripped therebetween in response to said inward gripping movement of the center members, means for automatically stopping rotation of said center members and for moving the latter outwardly out of engagement with said arbor after a predetermined time interval, and means for automatically actuating said reciprocating means to index said conveyor means to move said arbor out of said axial alignment with said center members and to move a succeeding arbor into said axially aligned position.

9. An apparatus for forming arbor cores and comprising means for rotatably mounting an arbor, conveyor means for successively feeding arbors to and from said mounting means, means for rotating an arbor while mounted in said mounting means, means for applying a coating of sand to the exterior surface of the arbor as it is being rotated, and knife means for forming said sand coating to predetermined shape and dimensions as the arbor is being rotated, said arbor mounting means comprising a pair of oppositely-facing axially-aligned spaced center members for engaging the opposite ends of the arbor, and means mounting the center members for rotatable movement about their axes and also longitudinal movement toward and away from each other in the direction of their axes, said conveyor means extending between said center members to position the arbors successively therebetween in axial alignment with said center members, means for automatically moving said center members toward each other to grip an arbor when said conveyor means has positioned said arbor in said axial alignment therewith, means for automatically actuating said arbor rotating means to rotate said center members and the arbor gripped therebetween in response to said inward gripping movement of the center members, means for automatically stopping rotation of said center members and for moving the latter outwardly out of engagement with said arbor after a predetermined time interval, and means for automatically actuating said reciprocating means to index said conveyor means to move said arbor out of said axial alignment with said center members and to move a succeeding arbor into said axially aligned position.

10. An apparatus for forming arbor cores and comprising conveyor means for moving an arbor into a working position, rotatable mounting means for automatically engaging the opposite ends of the arbor in response to movement of the arbor into said working position, drive means for automatically rotating said arbor in response to engagement of the arbor by said mounting means, feed means for automatically applying a layer of sand to the exterior surface of the arbor in response to actuation of said drive means, and sand forming knife means for automatically engaging said sand layer in response to actuation of said drive means and said feed means.

11. An apparatus as recited in claim 10 in combination with control means for automatically disengaging said knife means and de-actuating said drive means and said feed means after a predetermined time interval.

12. An apparatus as recited in claim 11 and comprising means for automatically disengaging said mounting means from said arbor in response to de-actuation of said drive means and said feed means, said conveyor means including means for automatically removing said arbor from said working position and moving a second arbor into said working position in response to disengagement of said mounting means.

13. An apparatus for forming arbor cores and comprising rotatable mounting means for engaging the opposite ends of an arbor, drive means for automatically rotating said arbor in response to engagement of the arbor by said mounting means, feed means for automatically applying a layer of sand to the exterior surface of the arbor in response to actuation of said drive means, and sand forming knife means for automatically engaging said sand layer in response to actuation of said drive means and said feed means.

14. An apparatus as recited in claim 13 in combination with control means for automatically disengaging said knife means and de-actuating said drive means and said feed means after a predetermined time interval.

15. An apparatus as recited in claim 14 wherein said control means comprises means for automatically disengaging said mounting means from said arbor in response to de-actuation of said drive means and said feed means.

16. An apparatus for forming arbor cores and comprising conveyor means for moving an arbor into a working position, rotatable mounting means for automatically engaging the opposite ends of the arbor in response to movement of the arbor into said working position, drive means for automatically rotating said arbor in response to engagement of the arbor by said mounting means, feed means for automatically applying a layer of sand to the exterior surface of the arbor in response to actuation of said drive means, and sand forming knife means for automatically engaging said sand layer in response to actuation of said drive means and said feed means, a plurality of fluid-actuated means, each for actuating said conveyor means, said knife means and said mounting means, respectively, and electrical control means for automatically actuating said fluid-actuated means in properly timed sequence.

17. An apparatus for forming arbor cores and comprising rotatable mounting means for engaging the opposite ends of an arbor, drive means for automatically rotating said arbor in response to engagement of the arbor by said mounting means, feed means for automatically applying a layer of sand to the exterior surface of the arbor in response to actuation of said drive means, and sand forming knife means for automatically engaging said sand layer in response to actuation of said drive means and said feed means, said arbor mounting means comprising a pair of oppositely-facing axially-aligned spaced center members for engaging the opposite ends of the arbor, and means mounting the center members for rotatable movement about their axes and also longitudinal movement toward and away from each other in the direction of their axes.

18. An apparatus as recited in claim 17 wherein said drive means comprises electric motor means, means drivingly connecting said electric motor means to said center members for rotating the latter in response to actuation of said electric motor means, and fluid-acuated means connected to said center members for moving the latter toward each other to grip an arbor therebetween, and away from each other to release said arbor.

19. An apparatus for forming arbor cores and comprising conveyor means for moving an arbor into a working position, rotatable mounting means for automatically engaging the opposite ends of the arbor in response to movement of the arbor into said working position, drive means for automatically rotating said arbor in response to engagement of the arbor by said mounting means, feed means for automatically applying a layer of sand to the exterior surface of the arbor in response to actuation of said drive means, and sand forming knife means for automatically engaging said sand layer in response to actuation of said drive means and said feed means, said conveyor means comprising a pair of continuous flexible conveyor members extending in parallel spaced relation and including a plurality of arbor supports at spaced intervals therealong for supporting the opposite ends of a series of arbors, an actuating member mounted for reciprocal movement in the direction of said conveyor members, means for reciprocating said actuating member, and means on said actuating member for drivingly engaging said conveyor members in one direction of movement of said actuating member to move said conveyor members therewith and being drivingly disengaged from said conveyor members in the opposite direction of movement of said actuating member, said arbor mounting means comprising a pair of oppositely-facing axially-aligned spaced center members for engaging the opposite ends of the arbor, and means mounting the center members for rotatable movement about their axes and also longitudinal movement toward and away from each other in the direction of their axes, said conveyor members extending between said center members to position the arbors successively therebetween in axial alignment with said center members and in said working position.

20. An apparatus for forming arbor cores and comprising conveyor means for moving a group of arbors simultaneously into a working position, rotatable mounting means for automatically engaging the opposite ends of each of said arbors simultaneously in response to movement of said group into said working position, drive means for automatically rotating said arbors simultaneously in response to engagement of the arbors by said mounting means, feed means for automatically applying a layer of sand to the exterior surface of each of said arbors simultaneously in response to actuation of said drive means, and a plurality of sand forming knife means, each for automatically engaging a respective one of said sand layers in response to actuation of said drive means and said feed means.

21. An apparatus as recited in claim 20 in combination with control means for automatically disengaging said knife means and de-actuating said drive means and said feed means after a predetermined time interval.

22. An apparatus as recited in claim 21 and comprising means for automatically disengaging said mounting means from said arbors in response to de-actuation of said drive means and said feed means, said conveyor means including means for automatically removing said group of arbors from said working position and moving a second group of arbors into said working position in response to disengagement of said mounting means.

23. An apparatus for forming arbor cores and comprising a predetermined number of pairs of rotatable mounting means, each of said pairs comprising two spaced oppositely-facing center members, conveyor means extending longitudinally between said center members of each pair for carrying a series of arbors in equidistant spaced relation thereon, means for moving said conveyor means a predetermined distance to bring a group of arbors each into axial alignment with respect to one of said pairs of center members, means for automatically moving said center members toward each other to grip the respective arbors therebetween in response to actuation of said conveyor moving means, drive means for automatically rotating said center members with said gripped arbors therebetween in response to actuation of said center member moving means, feed means for automatically applying a layer of sand to the exterior surfaces of said arbors in response to actuation of said drive means, a plurality of a sand forming knife means each for automatically engaging a respective one of said sand layers in response to actuation of said drive means and said feed means, control means for automatically disengaging said knife means and de-actuating said drive means and said feed means after a predetermined time interval, means for automatically moving said center member away from each other to disengage the arbors therebetween in response to de-actuation of said drive means and said feed means, means for automatically moving said conveyor means a distance equal to the spacing of adjacent arbors on said conveyor means multiplied by said predetermined number in response to said disengaging movement of the center members to bring another group of arbors each into axial alignment with respect to one of said pairs of center members, and means for automatically repeating the above-recited cycle of operations.

24. An apparatus as recited in claim 23 and comprising electrical means for automatically controlling said several means in properly timed sequence.

References Cited in the file of this patent

UNITED STATES PATENTS

| | | |
|---|---|---|
| 49,368 | Braid | Aug. 15, 1865 |
| 814,028 | Dimick et al. | Mar. 6, 1906 |
| 1,349,383 | Kleyensteuber | Aug. 10, 1920 |
| 1,690,541 | Kuzelewski | Nov. 6, 1928 |
| 1,743,281 | Morehead | Jan. 14, 1930 |
| 2,122,199 | Floyd | June 28, 1938 |
| 2,205,035 | Floyd | June 18, 1940 |
| 2,643,570 | Siekmann et al. | June 30, 1953 |
| 2,704,955 | Kendall et al. | Mar. 29, 1955 |